(12) United States Patent
Uemura et al.

(10) Patent No.: US 8,526,758 B2
(45) Date of Patent: Sep. 3, 2013

(54) IMAGE PROCESSING APPARATUS, IMAGE PROCESSING METHOD, AND PROGRAM

(75) Inventors: Shinichi Uemura, Kawasaki (JP); Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 12/973,772

(22) Filed: Dec. 20, 2010

(65) Prior Publication Data

US 2011/0158554 A1   Jun. 30, 2011

(30) Foreign Application Priority Data

Dec. 24, 2009   (JP) ................................. 2009-292861

(51) Int. Cl.
*G06K 9/40*   (2006.01)
*H04N 1/407*   (2006.01)

(52) U.S. Cl.
USPC ......................................... 382/275; 358/3.26

(58) Field of Classification Search
USPC ................. 382/218, 254, 260, 266, 274–275, 382/305, 312; 348/607; 358/3.26, 3.27, 358/516
See application file for complete search history.

(56) References Cited

U.S. PATENT DOCUMENTS

| | | | | |
|---|---|---|---|---|
| 5,099,329 A | * | 3/1992 | Oyama et al. | 348/620 |
| 7,369,165 B2 | * | 5/2008 | Bosco et al. | 348/272 |
| 7,719,731 B2 | * | 5/2010 | Saka et al. | 358/514 |
| 7,839,545 B2 | * | 11/2010 | Saka et al. | 358/514 |
| 7,847,838 B2 | * | 12/2010 | Ooishi | 348/241 |
| 7,885,478 B2 | * | 2/2011 | Lee et al. | 382/275 |
| 8,013,917 B2 | * | 9/2011 | Bosco et al. | 348/272 |
| 8,145,014 B2 | * | 3/2012 | Kwak et al. | 382/300 |

FOREIGN PATENT DOCUMENTS

JP   5-48893 A   2/1993

* cited by examiner

*Primary Examiner* — Kanjibhai Patel
(74) *Attorney, Agent, or Firm* — Canon U.S.A., Inc. IP Division

(57) ABSTRACT

An apparatus according to the present invention includes a detection unit configured to detect a noise based on pixel values of a neighboring pixel group having an interval of n pixel (s) (n is an integer of 1 or more) from a target pixel and a range of m pixel(s) (m is an integer of 1 or more) and a pixel value of the target pixel, and a replacement unit configured to replace the pixel value of the target pixel with an average value of the pixel values of the neighboring pixel group if the noise is detected.

12 Claims, 7 Drawing Sheets

IMAGE PROCESSING APPARATUS, IMAGE PROCESSING METHOD, AND PROGRAM

BACKGROUND OF THE INVENTION

1. Field of the Invention

The present invention relates to a technique for removing a noise component included in an image.

2. Description of the Related Art

In conventional image reading apparatuses such as a digital copying machine and a scanner, a filter unit for removing isolated points such as a stain in an image is used for an image processing. As a method for efficiently removing a noise, for example, Japanese Patent Application Laid-Open No. 5-48893 discusses the following image signal processing method.

In the image signal processing method discussed in Japanese Patent Application Laid-Open No. 5-48893, first, difference values between an intermediate signal value of three signal consecutive values and signal values adjacent to the intermediate signal value are calculated. Next, an average value between the two signal values adjacent to the intermediate signal value are calculated. The intermediate signal value is corrected to a signal value based on the average value when each of difference absolute values is greater than a predetermined reference value and polarities of the difference values between the intermediate signal value and the signal values adjacent to the intermediate signal value are inverted from each other. An isolated point noise can be removed without influencing on a high frequency component of image signals by performing such signal processing on entire pixels.

However, in some cases, the filter processing with using a low pass filter (LPF), a scaler, or the like may cause a blur like a gradation in a range of a few pixels in the vicinity of the isolated point noise. In such cases, the conventional noise detection method in which pixel values of pixels adjacent to a target pixel are used as operands has an issue of deterioration of detection accuracy of the isolated point noise since the blurred potion is also contained in a comparison reference range in the conventional method. The conventional method also has an issue that the isolated point noise component is included in a pixel to be corrected since the blurred potion in the vicinity of the isolated point noise is included in the calculation range in the case of calculating the pixel to be corrected.

SUMMARY OF THE INVENTION

According to an aspect of the present invention, an apparatus includes a detection unit configured to detect a noise based on pixel values of a neighboring pixel group having an interval of n pixel(s) (n is an integer of 1 or more) from a target pixel and a range of m pixel(s) (m is an integer of 1 or more) and a pixel value of the target pixel, and a replacement unit configured to replace the pixel value with an average value of the pixel values of the neighboring pixel group if the noise is detected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 2:
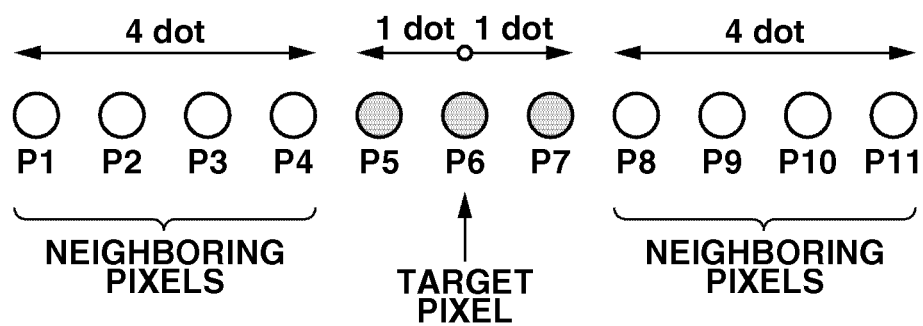
FIG. 2 illustrates an example of setting four consecutive pixels with spacing of one pixel from a target pixel as neighboring pixels.

Hereinafter, a first exemplary embodiment of the present invention will be described. FIG. 2 is an example of setting a group of pixels having an interval of one pixel from a target pixel and a range of four pixels as a group of neighboring pixels. As illustrated in FIG. 2, it is possible to select the groups of neighboring pixels (P1 to P4, and P8 to P11) that are free from an influence of a noise component around a target pixel (P6) by setting the interval from the target pixel (P6).

Figure 3:
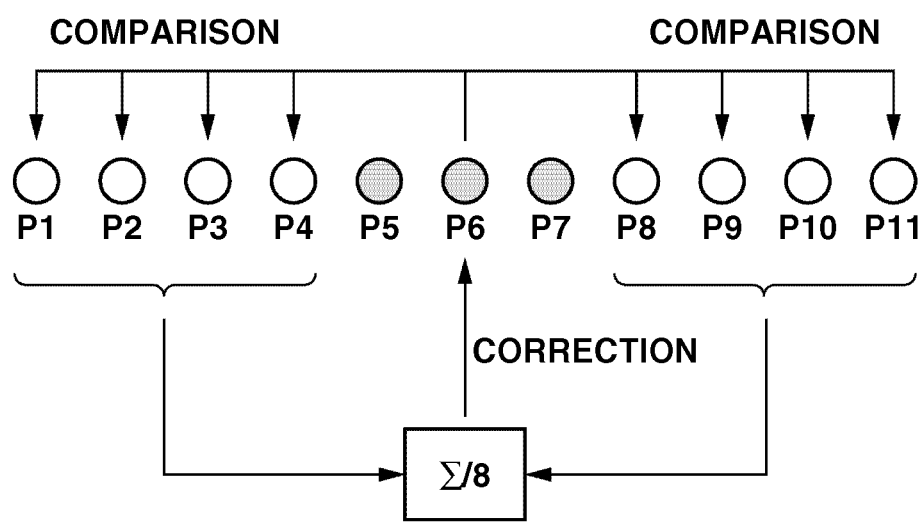
FIG. 3 schematically illustrates an operation of the first exemplary embodiment of the present invention.

Hereinafter, an operation of the present exemplary embodiment will be schematically described with reference to FIG. 3. Comparisons between a pixel value of the target pixel (P6) and each of pixel values of the groups of neighboring pixels (P1 to P4, and P8 to P11) having the interval of one pixel from the target pixel (P6) and the range of the four pixels each on the right and left on the drawing (eight pixels in total) are performed. If all of comparison results (differences) are greater than a threshold value, the pixel value of the target pixel is replaced with an average value of the pixel values of the groups of neighboring pixels. In contrast, if at least one of the comparison results is equal to or less than the threshold value, the replacing processing is not performed. Thus, the pixel value of the target pixel is compared with each of the pixel values of the groups of neighboring pixels for noise detection. Accordingly, since the case in which a noise is not detected as a result of the comparisons is increased when a text or a pattern in which thin lines are closely spaced is input, an original image is maintained, and image quality deterioration in a high frequency portion can be prevent.

Figure 1:
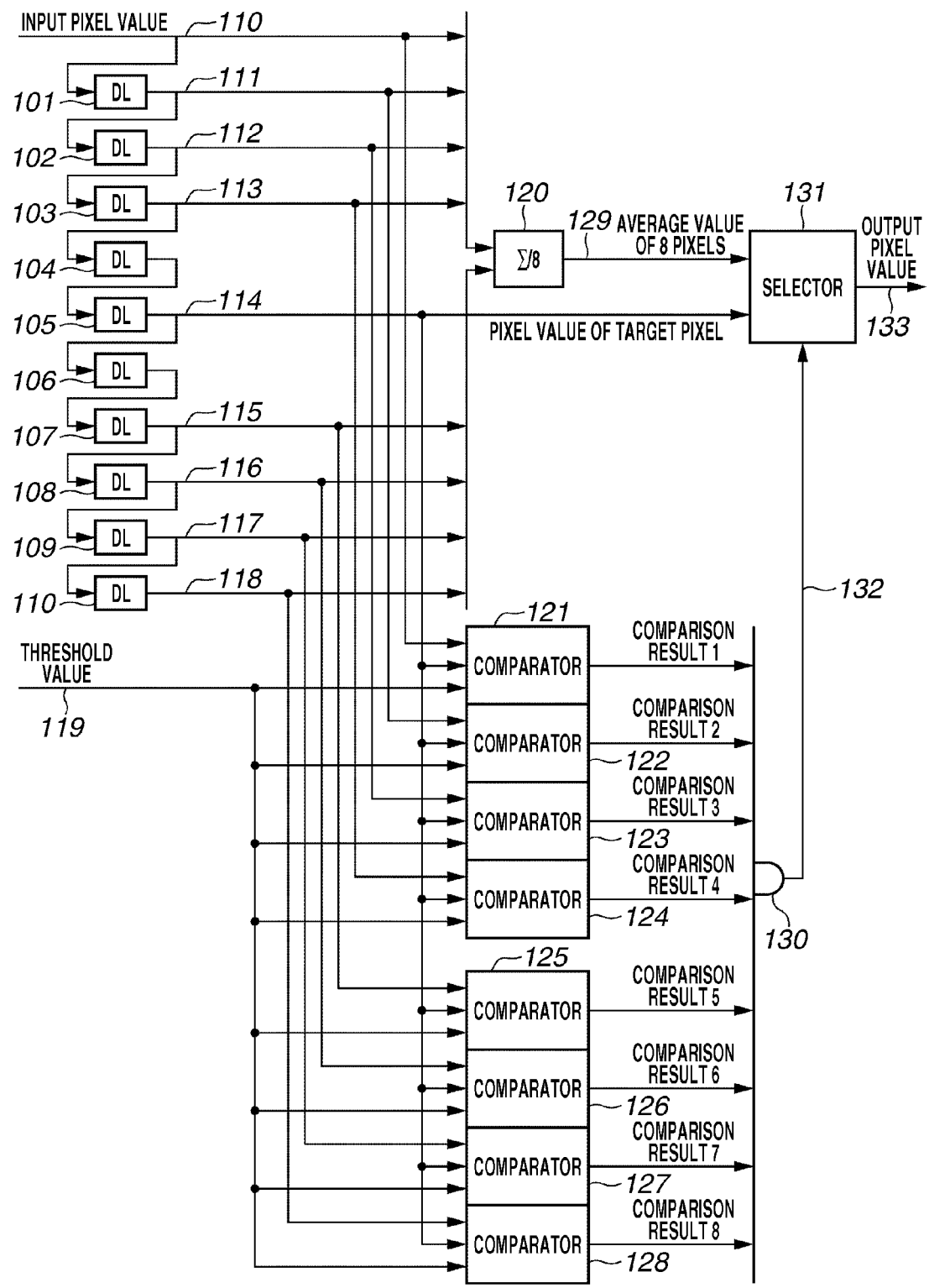
FIG. 1 illustrates a configuration of an image signal processing apparatus according to a first exemplary embodiment of the present invention.

FIG. 1 illustrates a configuration of an image signal processing apparatus according to a first exemplary embodiment of the present invention. Hereinafter, the configuration of the image signal processing apparatus according to the present exemplary embodiment and an operation of the image signal processing apparatus will be described with reference to FIG. 1. The image signal processing apparatus illustrated in FIG. 1 is an example of the configuration to which the image processing apparatus of the present invention is adapted.

Output values from pixels (input pixel values) are sequentially input into delay elements 101 to 110 to parallelly expand the input pixel values on an identical clock with a target pixel being at the center. At this time, it is possible to select neighboring pixels that are positioned with an interval from the target pixel by not using output values of the delay elements 104 and 106 adjacent to the delay element 105 being at the center.

An average value calculation circuit 120 calculates an average value 129 of the pixel values 100 to 113 and 115 to 118 of the groups of the neighboring pixels. Comparators 121 to 128 perform threshold value comparisons of difference absolute values between the pixel values 100 to 113 and 115 to 118 of the groups of neighboring pixels with a pixel value 114 of the target pixel. An AND element 130 performs noise determination by calculating a logical product of the threshold value comparison results. If all of output results of the comparators 121 to 128 are true, i.e., if all of comparison calculation results represented by Expression 3 shown below are true, output results of the AND element 130 becomes true, so that a determination result 132 is determined as a noise. On the other hand, if any of the output results of the comparators 121 to 128 is true, an output result of the AND element 130 becomes false, and it is determined that there is no noise.

Lastly, if the determination result 132 is determined as the noise, a selector 131 selects an average value 129 of the pixel values of the groups of neighboring pixels as an output pixel value 133. On the other hand, if the determination result 132 is determined as the noise, the selector 131 selects the pixel value 114 of the target pixel as the output pixel value 133. Each of the comparators 121 to 128 is an example of configuration to which a detection unit of the present invention is adapted. The selector 131 is an example of configuration to which a replacement unit of the present invention is adapted.

Figure 4:
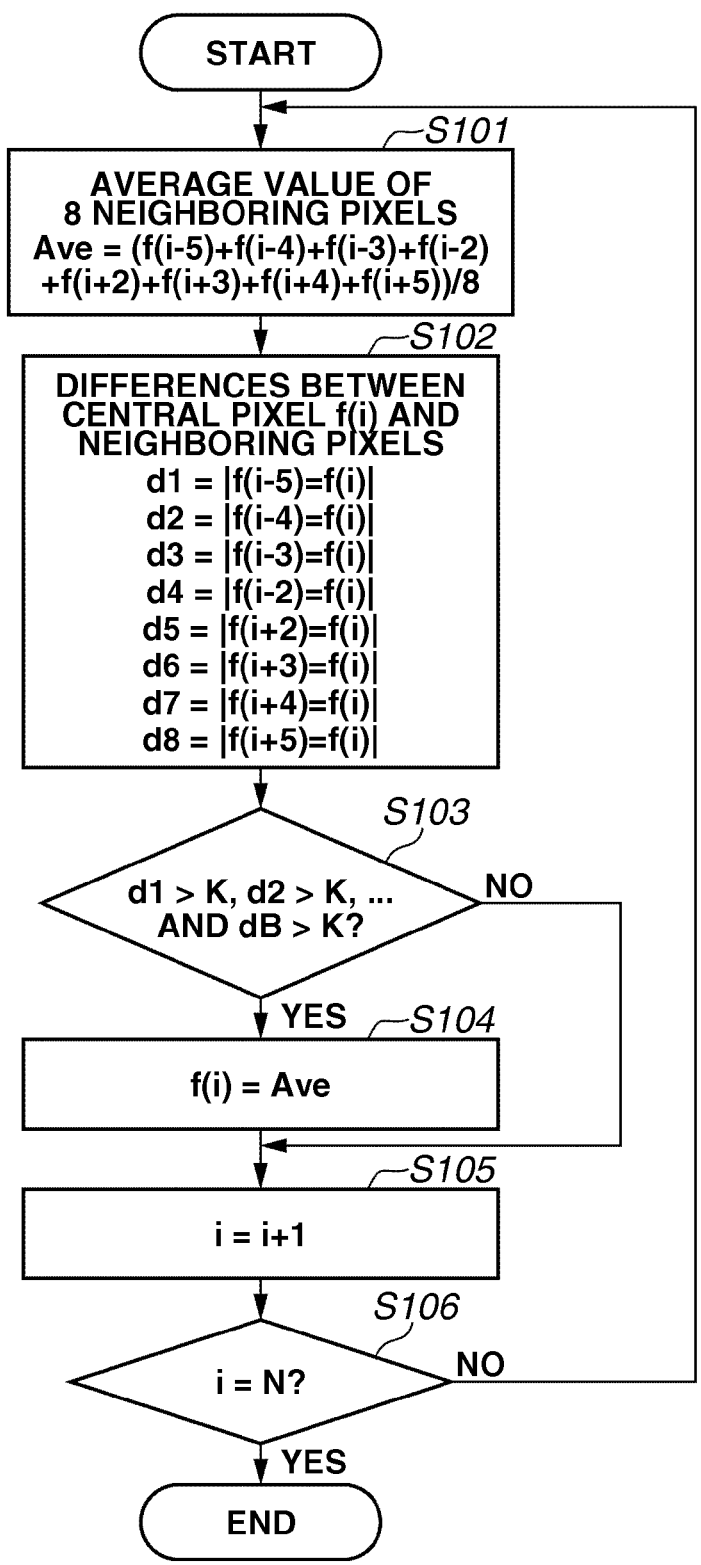
FIG. 4 is a flowchart illustrating noise removal calculation processing in the first exemplary embodiment of the present invention.

FIG. 4 is a flowchart illustrating noise removal calculation processing in the present exemplary embodiment. Hereinafter, the noise removal calculation processing in the present exemplary embodiment will be described in detail with reference to FIG. 4.

If the pixel value of the target pixel P6 is f(i), the pixel values of the groups of neighboring pixels (P1 to P4, and P8 to P11) can be represented as follows:
P1=f(i−5), P2=f(i−4), P3=f(i−3), P4=f(i−2), P8=f(i+2), P9=f(i+3), P10=f(i+4), and P11=f(i+5).

In step S101, the average value calculation circuit 120 calculates an average value Ave of the pixel values of the groups of neighboring pixels with the pixel value f(i) of the target pixel being the center by the following Expression 1.

$$\text{Ave}=(f(i-5)+f(i-4)+f(i-3)+f(i-2)+f(i+2)+f(i+3)+f(i+4)+f(i+5))/8 \quad \text{Expression 1}$$

In step S102, the comparators 121 to 128 calculate difference absolute values d1 to d8 between the pixel values of the groups of neighboring pixels and the pixel value of the target pixel by Expression 2.

$$d1=|f(i-5)-f(i)|, d2=|f(i-4)-f(i)|, d3=|f(i-3)-f(i)|,$$
$$d4=|f(i-2)-f(i)|, d5=|f(i+2)-f(i)|, d6=|f(i+3)-f(i)|,$$
$$d7=|f(i+4)-f(i)|, d8=|f(i+5)-f(i)| \quad \text{Expression 2}$$

In Expression 2, since the differences d1 to d8 are calculated as absolute values, it is possible to detect both of an isolated point noise (a black isolated point noise, for example) having a value lower than the pixel values of the groups of neighboring pixels and an isolated point noise (a white isolated point noise, for example) having a value higher than the pixel values of the groups of neighboring pixels as detection targets.

In step S103, the comparators 121 to 128 perform comparison calculations between the difference absolute values and a threshold value K (K≧0) as shown in Expression 3, and the AND element 130 determines that there is a noise if all of comparison results are true. If there is the noise (YES in step S103), the processing proceeds to step S104. On the other hand, if it is determined that there is no noise (NO in step S103) since not all of the comparison results are true, the processing proceeds to step S105 without executing the processing in step S104.

$$d1>K, d2>K, d3>K, d4>K, d5>K, d6>K, d7>K, \text{ and } d8>K \quad \text{Expression 3}$$

In step S104, the selector 131 selects the average value Ave 129 of the pixel values of the groups of neighboring pixels as the output pixel value 133 by replacing the pixel value f(i) 114 of the target pixel with the average value Ave 129. In step S105, the image signal processing apparatus updates the target pixel. In step S106, the image signal processing apparatus determines whether the current target pixel is a final pixel. If the current target pixel is the final pixel (YES in step S106), the processing is terminated. If the current target pixel is not the final pixel (NO in step S106), the processing returns to step S101.

If either one of the black isolated point noise or the white isolated point noise is set as a correction target, difference values are used in place of the difference absolute values of Expression 2. For example, in the case of detecting only the isolated point noise having a value lower than the pixel values of the groups of neighboring pixels, Expression 4 is used.

$$d1=f(i-5)-f(i), d2=f(i-4)-f(i), d3=f(i-3)-f(i), d4=f(i-2)-f(i), d5=f(i+2)-f(i), d6=f(i+3)-f(i), d7=f(i+4)-f(i), d8=f(i+5)-f(i) \quad \text{Expression 4}$$

Since any of calculation results of Expression 4 is negative if the pixel value of the target pixel is higher than the pixel values of the groups of neighboring pixels, the comparison result in step S103 becomes false, so that noise detection is not performed.

In the case of detecting only the isolated point noise having a value higher than the pixel values of the groups of neighboring pixels, Expression 5 is used.

$$d1=f(i)-f(i-5), d2=f(i)-f(i-4), d3=f(i)-f(i-3), d4=f(i)-f(i-2), d5=f(i)-f(i+2), d6=f(i)-f(i+3), d7=f(i)-f(i+4), d8=f(i)-f(i+5) \quad \text{Expression 5}$$

Since calculation results of Expression 5 are negative if the pixel value of the target pixel is lower than the pixel values of the groups of neighboring pixels, the comparison result in step S103 becomes false, so that noise detection is not performed.

Figure 6:
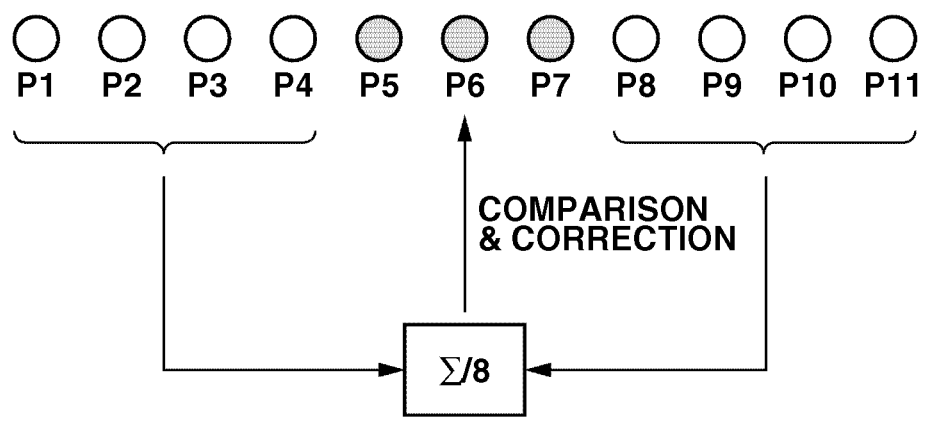
FIG. 6 schematically illustrates an operation of the second exemplary embodiment of the present invention.

Hereinafter, a second exemplary embodiment of the present invention will be described. Firstly, an operation of the present exemplary embodiment will be schematically described with reference to FIG. 6. Referring to FIG. 6, a comparison between a pixel value of a target pixel (P6) and an average value of pixel values of groups of neighboring pixels (P1 to P4, and P8 to P11) having an interval of one pixel from the target pixel (P6) and a range of four pixels (eight pixels in total) is performed. When a comparison result (difference) is greater than a threshold value, the pixel value of the target pixel is replaced with the average value of the pixel values of the groups of neighboring pixels. In contrast, if the comparison result is equal to or less than the threshold value, the replacement processing is not performed.

Figure 5:
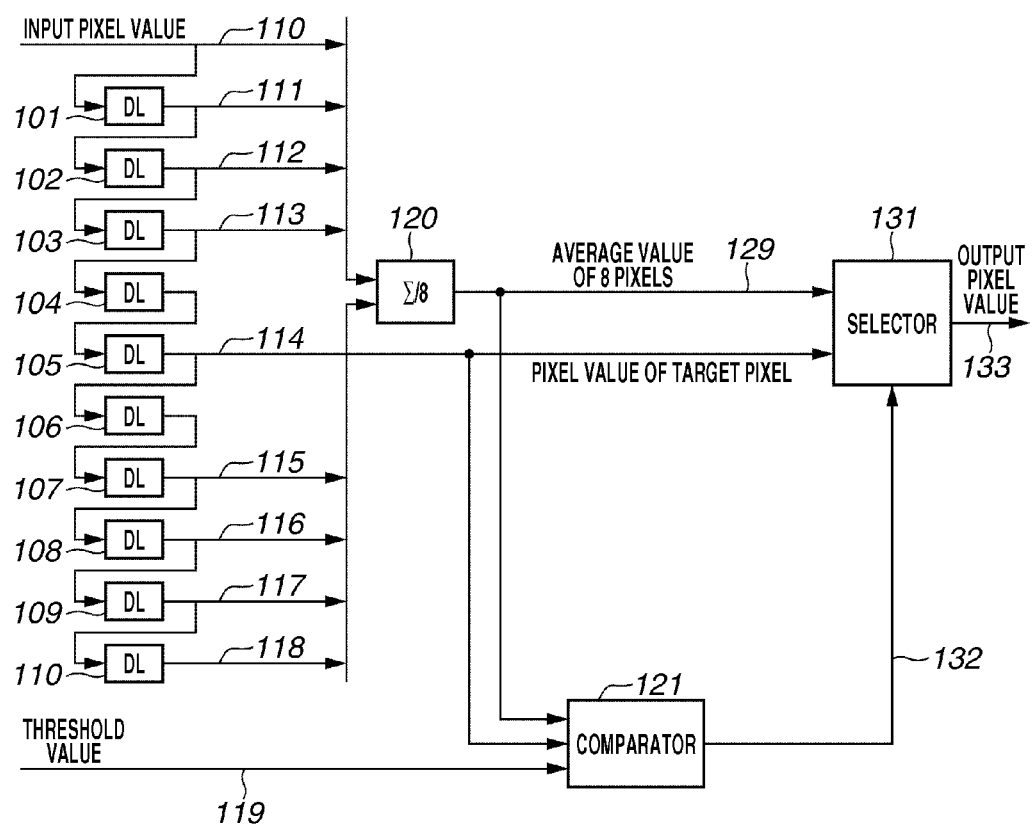
FIG. 5 illustrates a configuration of an image signal processing apparatus according to a second exemplary embodiment of the present invention.

FIG. 5 illustrates a configuration of an image signal processing apparatus according to the second exemplary embodiment of the present invention. Hereinafter, the configuration of the image signal processing apparatus according to the present exemplary embodiment and an operation of the image signal processing apparatus will be described with reference to FIG. 5.

Output values from pixels (input pixel values) are sequentially input into delay elements 101 to 110 to parallelly expand the input pixel values on an identical clock with a target pixel being at the center. At this time, it is possible to select neighboring pixels that are positioned with an interval from the target pixel by not using output values of the delay elements 104 and 106 adjacent to the delay element 105 being at the center.

An average value calculation circuit 120 calculates an average value 129 of the pixel values 100 to 113 and 115 to 118 of the groups of the neighboring pixels. A comparator 121 performs threshold value comparison between the average value 129 with a pixel value 114 of the target pixel and noise determination. If an output result of the comparator 121 is true, i.e., if a comparison calculation result represented by Expression 8 shown below is true, a determination result 132 is determined as a noise. In contrast, if the output result of the comparator 121 is false, i.e., if the comparison calculation result represented by Expression 8 shown below is false, it is determined that there is no noise.

Lastly, if it is determined that the determination result 132 is a noise, the selector 131 selects the average value 129 of the pixel values of the groups of neighboring pixels as an output pixel value 133. In contrast, if it is determined that the determination result 132 is not a noise, the selector 131 selects the pixel value 114 of the target pixel as the output pixel value 133.

Figure 7:
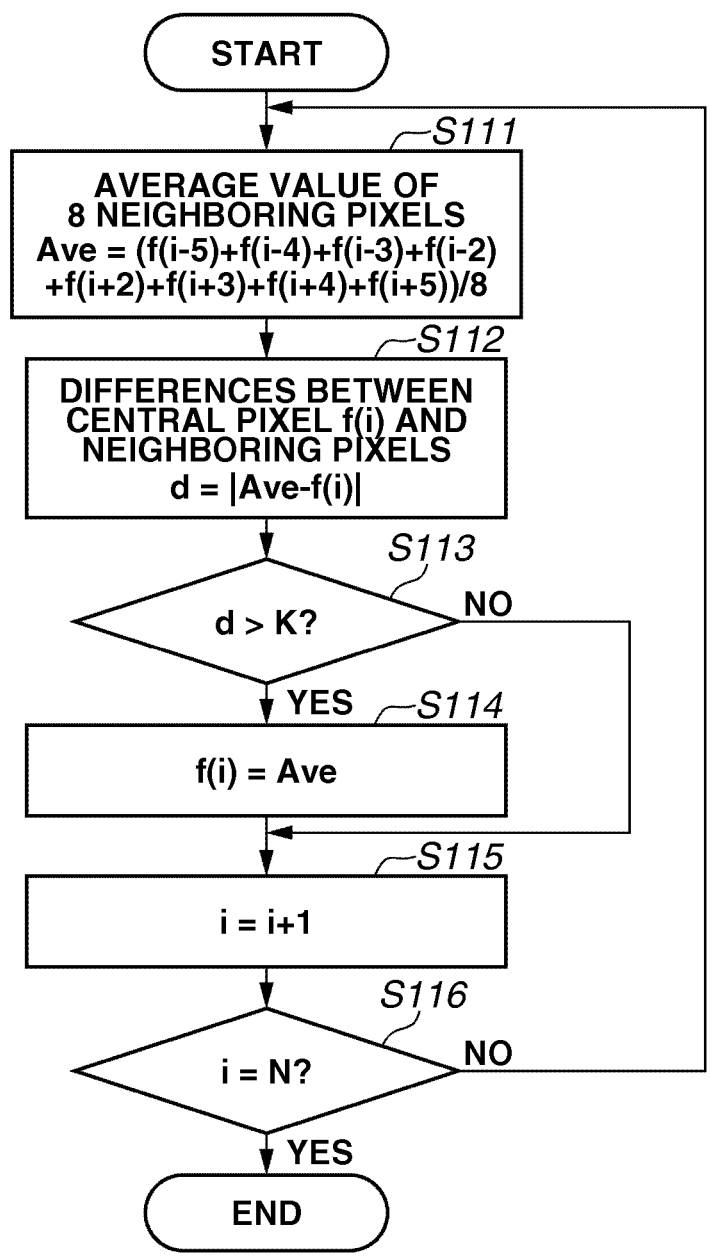
FIG. 7 is a flowchart illustrating noise removal calculation processing in the second exemplary embodiment of the present invention.

FIG. 7 is a flowchart illustrating noise removal calculation processing in the present exemplary embodiment. Hereinafter, the noise removal calculation processing in the present exemplary embodiment will be described in detail with reference to FIG. 7.

If the pixel value of the target pixel P6 is f(i), the pixel values of the groups of neighboring pixels (P1 to P4, and P8 to P11) can be represented as follows:
P1=f(i−5), P2=f(i−4), P3=f(i−3), P4=f(i−2), P8=f(i+2), P9=f(i+3), P10=f(i+4), and P11=f(i+5).

In step S111, the average value calculation circuit 120 calculates an average value Ave of the pixel values of the groups of neighboring pixels with the pixel value f(i) of the target pixel being the center by the following Expression 6.

$$\text{Ave}=(f(i-5)+f(i-4)+f(i-3)+f(i-2)+f(i+2)+f(i+3)+f(i+4)+f(i+5))/8 \quad \text{Expression 6}$$

In step S112, the comparator 121 calculates a difference absolute value d between the average value Ave and the pixel value of the target pixel by Expression 7.

$$d=|\text{Ave}-f(i)| \quad \text{Expression 7}$$

In Expression 7, since the difference d is calculated as an absolute value, it is possible to detect both of an isolated point noise (a black isolated point noise, for example) having a value lower than the pixel values of the groups of neighboring pixels and an isolated point noise (a white isolated point noise, for example) having a value higher than the pixel values of the groups of neighboring pixels as detection targets.

In step S113, the comparator 121 performs a comparison calculation between the difference absolute value d and a threshold value K(K≧0) as Expression 8.

$$d>K \quad \text{Expression 8}$$

If a comparison result is true, the comparator 121 determines that there is a noise. In contrast, if the comparison result is false, the comparator 121 determines that there is no noise. If it is determined that there is the noise (YES in step S113), the processing proceeds to step S114. On the other hand, if it is determined that there is no noise (NO in step S113), the processing proceeds to step S115 without executing the processing in step S114.

In step S114, the selector 131 selects the average value Ave 129 of the pixel values of the groups of neighboring pixels as the output pixel value 133 by replacing the pixel value f(i) 114 of the target pixel with the average value Ave 129. In step S115, the image signal processing apparatus updates the target pixel. In step S116, the image signal processing apparatus determines whether the current target pixel is the final pixel. If the current target pixel is the final pixel (YES in step S116), the processing is terminated. If the current target pixel is not the final pixel (NO in step S116), the processing returns to step S111.

Similar to the first exemplary embodiment, if either one of the black isolated point noise or the white isolated point noise is set as a correction target, a difference value is used in place of the difference absolute value of Expression 7. For example, in the case of detecting only the isolated point noise having a value lower than the pixel values of the groups of neighboring pixels, the following Expression 9 is used.

$$d=\text{Ave}-f(i) \quad \text{Expression 9}$$

Since the calculation result of Expression 9 is negative if the pixel value of the target pixel is higher than the pixel values of the groups of neighboring pixels, the comparison result in step S113 becomes false, so that noise detection is not performed.

In the case of detecting only the isolated point noise having a value higher than the pixel values of the groups of neighboring pixels, the following Expression 10 is used.

$$d=f(i)-\text{Ave} \quad \text{Expression 10}$$

Since the calculation result of Expression 10 is negative if the pixel value of the target pixel is lower than the pixel values of the groups of neighboring pixels, the comparison result in step S113 becomes false, so that noise detection is not performed.

In the foregoing exemplary embodiments, though the group of neighboring pixels having the interval of one pixel from the target pixel and the range of four pixels is selected, the number of pixels for the interval and the range may be an arbitrary integer of 1 or more. By setting the group of neighboring pixels having the interval of n pixel(s) (n≧1) from the target pixel and the range of m pixel(s) (m≧1) as a reference range, it is possible to eliminate influence such as blur in the vicinity of the isolated point noise and to improve noise detection accuracy. It is also possible to calculate a correction value that is less subject to the influence of blur in the vicinity of the isolated point noise.

As a method for threshold value comparison, in the method of comparing the differences between the pixel value of the target pixel and the pixel values of the groups of neighboring pixels with the predetermined threshold value, noise is not determined if any one of the neighboring pixels has the pixel value equal to or less than the threshold value. Therefore, a thin letter, an edge portion, or the like is prevented from being erroneously determined as a noise, thereby preventing deterioration of an original image.

Also, in the method of comparing the difference between the pixel value of the target pixel and the average value of the pixel values of the groups of neighboring pixels with the threshold value, a noise is more likely to be determined since the comparison is performed between the pixel value of the target pixel and the average value of the pixel values of the groups of neighboring pixels even when any one of the pixel values of the groups of neighboring pixels is equal to or less than the threshold value. Therefore, it is possible to remove a larger amount of isolated point noises. It is also possible to perform noise detection and a noise correction calculation that are free from influence of noise in the vicinity of the isolated point noise.

The present invention can also be realized by executing the following processing. More specifically, the processing includes providing a system or an apparatus with software (a program) realizing the functions of the above described exemplary embodiments via a network or various storage media, and reading and executing the program by a computer, a central processing unit (CPU), a micro-processing unit (MPU), or the like of the system or the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-292861 filed Dec. 24, 2009, which is hereby incorporated by reference herein in its entirety.

What is claimed is:

1. An apparatus, comprising:
   a detection unit configured to detect a noise based on pixel values of a neighboring pixel group having an interval of n pixel(s) (n is an integer of 1 or more) from a target pixel and a range of m pixel(s) (m is an integer of 1 or more) and a pixel value of the target pixel; and
   a replacement unit configured to replace the target pixel value with an average value of the pixel values of the neighboring pixel group if the noise is detected,
   wherein the target pixel is updated until the target pixel is a final pixel;
   wherein the detection unit detects the noise by comparing a difference absolute value or a difference value between an average value of the pixel values of the neighboring pixel group and the pixel value of the target pixel with a predetermined threshold value.

2. The apparatus according to claim 1, wherein the detection unit detects the noise by comparing difference absolute values or difference values between each of the pixel values of the neighboring pixel groups and the pixel value of the target pixel with a predetermined threshold value.

3. The apparatus according to claim 2, wherein the detection unit detects the noise if all of the difference absolute values or the difference values are greater than the predetermined threshold value.

4. The apparatus according to claim 1, wherein the detection unit detects the noise if the difference absolute value or the difference value is greater than the predetermined threshold value.

5. A method comprising:
   detecting a noise based on pixel values of a neighboring pixel group having an interval of n pixel(s) (n is an integer of 1 or more) from a target pixel and a range of m pixel(s) (m is an integer of 1 or more) and a pixel value of the target pixel; and
   replacing the pixel value with an average value of the pixel values of the neighboring pixel group if the noise is detected;
   wherein the target pixel is updated until the target pixel is a final pixel;
   wherein the detecting the noise includes comparing a difference absolute value or a difference value between an average value of the pixel values of the neighboring pixel group and the pixel value of the target pixel with a predetermined threshold value.

6. The method according to claim 5, wherein detecting the noise includes comparing difference absolute values or difference values between each of the pixel values of the neighboring pixel groups and the pixel value of the target pixel with a predetermined threshold value.

7. The method according to claim 6, wherein the detecting detects the noise if all of the difference absolute values or the difference values are greater than the predetermined threshold value.

8. The method according to claim 5, wherein the detecting detects the noise if the difference absolute value or the difference value is greater than the predetermined threshold value.

9. A non-transitory computer readable storage medium storing a computer-executable program of instructions for causing a computer to perform a method comprising:
   detecting a noise based on pixel values of a neighboring pixel group having an interval of n pixel(s) (n is an integer of 1 or more) from a target pixel and a range of m pixel(s) (m is an integer of 1 or more) and a pixel value of the target pixel; and
   replacing the target pixel value with an average value of the pixel values of the neighboring pixel group if the noise is detected,
   wherein the target pixel is updated until the target pixel is a final pixel;
   wherein the detecting the noise includes comparing a difference absolute value or a difference value between an average value of the pixel values of the neighboring pixel group and the pixel value of the target pixel with a predetermined threshold value.

10. The non-transitory computer readable storage medium according to claim 9, wherein detecting the noise includes comparing difference absolute values or difference values between each of the pixel values of the neighboring pixel groups and the pixel value of the target pixel with a predetermined threshold value.

11. The non-transitory computer readable storage medium according to claim 10, wherein the detecting detects the noise if all of the difference absolute values or the difference values are greater than the predetermined threshold value.

12. The non-transitory computer readable storage medium according to claim 9, wherein the detecting detects the noise if the difference absolute value or the difference value is greater than the predetermined threshold value.

* * * * *